United States Patent  (10) Patent No.: US 7,372,546 B2
Tabata et al.  (45) Date of Patent: May 13, 2008

(54) OPTICAL AXIS ADJUSTMENT DEVICE AND EXPOSURE APPARATUS USING THE SAME

(75) Inventors: Yoshinori Tabata, Hidaka (JP); Toshihide Ito, Hidaka (JP); Takeshi Kawakami, Tokyo (JP); Tsuyoshi Kashiwagi, Tokyo (JP); Tsuyoshi Yamauchi, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 175 days.

(21) Appl. No.: 11/127,800

(22) Filed: May 12, 2005

(65) Prior Publication Data

US 2006/0072092 A1  Apr. 6, 2006

(30) Foreign Application Priority Data

May 18, 2004 (JP) ............................. 2004-147238
May 18, 2004 (JP) ............................. 2004-147239

(51) Int. Cl.
*G03B 27/52* (2006.01)
*G03B 27/54* (2006.01)
*G03B 27/70* (2006.01)

(52) U.S. Cl. .............................. 355/55; 355/67; 355/60

(58) Field of Classification Search ................. 355/55, 355/67, 53, 60; 359/205, 627; 356/498
See application file for complete search history.

(56) References Cited

U.S. PATENT DOCUMENTS 6,175,451 B1 * 1/2001 Iriyama et al. ............. 359/627
2002/0080459 A1 * 6/2002 Takeuchi .................... 359/205

* cited by examiner

*Primary Examiner*—Peter B. Kim
(74) *Attorney, Agent, or Firm*—Ladas and Parry LLP

(57) ABSTRACT

In order to adjust the optical axis of a light beam L1 in an exposure apparatus, on a support body in an XYZ three-dimensional coordinate system are mounted: a first mirror 10 having a reflective surface M1 obtained by rotating a plane parallel to the XY plane around an axis 11 parallel to the Y axis by an angle of α; and a second mirror 20 having a reflective surface M2 obtained by rotating a plane parallel to the XZ plane around an axis 21 parallel to the X axis by an angle of β. There are provided: position adjustment means for moving the entire support body having the two mirrors parallel to the XY plane; and angle adjustment means for adjusting the angle of the second mirror 20. The incident light L1 is reflected on the reflective surfaces M1 and M2 to be output as an outgoing light L3, where it is possible to perform an optical axis adjustment concerning position and angle by controlling the position adjustment means and the angle adjustment means.

6 Claims, 8 Drawing Sheets

PRIOR ART

OPTICAL AXIS ADJUSTMENT DEVICE AND EXPOSURE APPARATUS USING THE SAME

BACKGROUND OF THE INVENTION

The present invention relates to an optical axis adjustment device and an automatic optical axis adjustment system, and more particularly to a technique for adjusting the angle and position of a light beam using a simple optical system. The present invention relates further to an exposure apparatus having an optical axis adjustment function, and more particularly to an exposure apparatus that requires a highly accurate optical axis adjustment to be used when, for example, providing a hologram image on a photosensitive material layer.

A light beam is widely used in various industrial fields such as exposure process for micro-patterns, material working process, and information communication. In optical systems utilizing a light beam, it is important to adjust the optical axis, and particularly, in processes for accurate processing utilizing laser beams, etc., it is necessary to perform an optical axis adjustment with accuracy. Common optical axis adjustment devices for a light beam are constituted by incorporating optical elements such as reflectors and prisms.

As a method of forming micro-patterns using a light beam, the method for illuminating a predetermined exposure plane and of partially exposing a photosensitive material layer disposed on the exposure plane is widely used in manufacturing processes for semiconductor devices, forming processes for hologram images, etc. Exposure apparatuses used in such exposing operations generally have a structure of guiding an exposure beam generated in a beam source to an exposure plane, expanding the beam diameter as appropriate, and illuminating the exposure plane. In order to guide an exposure beam to an appropriate position, it is important, in the optical system for guiding the exposure beam, to adjust the position of the optical axis with accuracy. The optical axis adjustment for a light beam may be performed by an operator in a visual and manual manner or may be performed by an automatic control based on an output signal from a position sensor for a light beam, using a device incorporating optical elements such as reflectors and prisms as mentioned above.

However, conventional common optical axis adjustment devices, which employ a complex optical system incorporating reflectors and prisms, suffer from a problem of having a complex overall structure. There is also a problem in that since the number of reflections within such devices is increased, there occurs a loss in the light intensity of a light beam passing therethrough.

SUMMARY OF THE INVENTION

A first object of the present invention is to provide an optical axis adjustment device capable of reducing the number of reflections of light and of performing an optical axis adjustment for a light beam efficiently with as simple a structure as possible, and more particularly to provide an optical axis adjustment device capable of adjusting the position and angle of a light beam separately. A second object of the present invention is to provide an automatic optical axis adjustment system capable of performing an automatic optical axis adjustment using the optical axis adjustment device. A third object of the present invention is to provide an exposure apparatus comprising an optical axis adjustment mechanism with as simple a structure as possible and capable of performing an optical axis adjustment for an exposure beam efficiently.

(1) A first aspect of the present invention is directed to an optical axis adjustment device having a function of adjusting an optical axis of a light beam which is made incident to an XYZ three-dimensional coordinate system and outputting an adjusted light beam, the device comprising:

a first mirror having a reflective surface obtained by rotating a plane parallel to the XY plane around a rotation axis parallel to the Y axis by a predetermined angle of $\alpha$ ($0° < \alpha < 90°$);

a second mirror having a reflective surface obtained by rotating a plane parallel to the XZ plane around a rotation axis parallel to the X axis by a predetermined angle of $\beta$ ($0° < \beta < 90°$);

a support body for supporting the first and second mirrors in predetermined positions so that the incident light is reflected on at least both the mirrors to be output; and position adjustment means for moving the first mirror with a parallel displacement in the X or Z axis direction and for moving the second mirror with a parallel displacement in the Y or Z axis direction relative to the support body.

(2) A second aspect of the present invention is directed to an optical axis adjustment device having a function of adjusting an optical axis of a light beam which is made incident to an XYZ three-dimensional coordinate system and outputting an adjusted light beam, the device comprising:

a first mirror having a reflective surface obtained by rotating a plane parallel to the XY plane around a rotation axis parallel to the Y axis by a predetermined angle of $\alpha$ ($0° < \alpha < 90°$);

a second mirror having a reflective surface obtained by rotating a plane parallel to the XZ plane around a rotation axis parallel to the X axis by a predetermined angle of $\beta$ ($0° < \beta < 90°$);

a first support body for supporting the first and second mirrors in predetermined positions so that the incident light is reflected on at least both the mirrors to be output;

a second support body for supporting the first support body; and position adjustment means for moving the first support body with a parallel displacement in the X and Y axes directions relative to the second support body.

(3) A third aspect of the present invention is directed to the optical axis adjustment device according to the above-mentioned first or second aspect, further comprising:

angle adjustment means having a function of performing an inclining operation in a predetermined direction for at least one of either the first or second mirror.

(4) A fourth aspect of the present invention is directed to the optical axis adjustment device according to the above-mentioned third aspect, wherein:

one of the first and second mirrors is a fixed mirror not to be inclined, while the other is an inclined mirror to be inclined, only the inclined mirror being subject to an inclining operation.

(5) A fifth aspect of the present invention is directed to an automatic optical axis adjustment system having a function of performing an automatic optical axis adjustment so that when there is a light beam along a reference optical path passing through predetermined incident and outgoing points in an XYZ three-dimensional coordinate system, the outgoing light keeps along the reference optical path even if the incident light runs out of the reference optical path, the system being composed of:

an adjustment unit for performing an optical axis adjustment; a detection unit for detecting optical axis displacement; and a control unit for controlling the adjustment unit based on a detection result by the detection unit, the adjustment unit comprising:

a first mirror having a reflective surface obtained by rotating a plane parallel to the XY plane around a rotation axis parallel to the Y axis by a predetermined angle of α ($0°<\alpha<90°$);

a second mirror having a reflective surface obtained by rotating a plane parallel to the XZ plane around a rotation axis parallel to the X axis by a predetermined angle of β ($0°<\beta<90°$);

a support body for supporting the first and second mirrors in predetermined positions so that the incident light is reflected on at least both the mirrors to be output;

position adjustment means for moving the first mirror with a parallel displacement in the X or Z axis direction and for moving the second mirror with a parallel displacement in the Y or Z axis direction relative to the support body; and angle adjustment means having a function of performing an inclining operation in a predetermined direction for at least one of either the first or second mirror, the detection unit having a function of detecting the angle and position of the light beam output from the adjustment unit, and the control unit comprising: storage means for storing the angle and position detected by the detection unit when the incident light runs along the reference optical path; and control means for controlling the angle adjustment means and the position adjustment means in such a manner, when the angle and position detected by the detection unit are different from those stored in the storage means, as to eliminate the difference.

(6) A sixth aspect of the present invention is directed to an automatic optical axis adjustment system having a function of performing an automatic optical axis adjustment so that when there is a light beam along a reference optical path passing through predetermined incident and outgoing points in an XYZ three-dimensional coordinate system, the outgoing light keeps along the reference optical path even if the incident light runs out of the reference optical path, the system being composed of:

an adjustment unit for performing an optical axis adjustment; a detection unit for detecting optical axis displacement; and a control unit for controlling the adjustment unit based on a detection result by the detection unit, the adjustment unit comprising:

a first mirror having a reflective surface obtained by rotating a plane parallel to the XY plane around a rotation axis parallel to the Y axis by a predetermined angle of α ($0°<\alpha<90°$);

a second mirror having a reflective surface obtained by rotating a plane parallel to the XZ plane around a rotation axis parallel to the X axis by a predetermined angle of β ($0°<\beta<90°$);

a first support body for supporting the first and second mirrors in predetermined positions so that the incident light is reflected on at least both the mirrors to be output;

a second support body for supporting the first support body;

position adjustment means for moving the first support body with a parallel displacement in the X and Y axes directions relative to the second support body; and angle adjustment means having a function of performing an inclining operation in a predetermined direction for at least one of either the first or second mirror, the detection unit having a function of detecting the angle and position of the light beam output from the adjustment unit, and the control unit comprising: storage means for storing the angle and position detected by the detection unit when the incident light runs along the reference optical path; and control means for controlling the angle adjustment means and the position adjustment means in such a manner, when the angle and position detected by the detection unit are different from those stored in the storage means, as to eliminate the difference.

(7) A seventh aspect of the present invention is directed to the automatic optical axis adjustment system according to the above-mentioned fifth or sixth aspect, wherein:

one of the first and second mirrors is a fixed mirror not to be inclined, while the other is an inclined mirror to be inclined, only the inclined mirror being subject to an inclining operation.

(8) An eighth aspect of the present invention is directed to the automatic optical axis adjustment system according to any of the above-mentioned fifth to seventh aspects, wherein:

the detection unit comprises: first beam splitting means for extracting part of the light beam output from the adjustment unit as a detection-use light beam; second beam splitting means for splitting the detection-use light beam into two beams; angle detection means for detecting the angle based on a first split beam; and position detection means for detecting the position based on a second split beam.

(9) A ninth aspect of the present invention is directed to the automatic optical axis adjustment system according to the above-mentioned eighth aspect, wherein:

the angle detection means is composed of: a condenser lens for condensing parallel light beams onto a predetermined focal point; and a light-receiving element having a light-receiving surface arranged apart from the condenser lens by the focal distance thereof to detect the condensing position on the light-receiving surface.

(10) A tenth aspect of the present invention is directed to the automatic optical axis adjustment system according to the above-mentioned eighth aspect, wherein:

the position detection means is composed of a light-receiving element for detecting the beam receiving position on a predetermined light-receiving surface.

(11) An eleventh aspect of the present invention is directed to an exposure apparatus for exposing a photosensitive material disposed on a predetermined exposure plane by illuminating the exposure plane, the apparatus being composed of a beam source for generating an exposure-use light beam;

beam guiding means for guiding the light beam generated in the beam source to the exposure plane along a predetermined reference optical path; and a beam diameter expanding device for expanding the diameter of the light beam guided by the beam guiding means in response to the size of the exposure plane, the beam guiding means incorporating the optical axis adjustment device or the automatic optical axis adjustment system according to any of the above-mentioned first to tenth aspects thereinto.

In the optical axis adjustment device according to the present invention, the two mirrors are arranged in particular positions and moved with a parallel displacement in particular directions to adjust the position of a light beam, whereby it is possible to perform an optical axis adjustment for a light beam with a very simple structure. Also, since the number of reflections of a light beam to be adjusted is reduced, the loss in light intensity of the light beam passing through the device can be minimized. In addition, thus providing the angle adjustment means for adjusting the angle of the mirrors allows the position and angle of a light beam to be adjusted separately with a simple structure.

In the automatic optical axis adjustment system according to the present invention, thus using the above-mentioned optical axis adjustment device allows an automatic optical axis adjustment to be performed.

In the exposure apparatus according to the present invention, in order to perform an optical axis adjustment, the two mirrors are arranged in particular positions and moved with a parallel displacement in particular directions to adjust the position of an exposure beam, whereby it is possible to perform an optical axis adjustment for an exposure beam with a very simple structure. Also, since the number of reflections of a light beam required for optical axis adjustment is reduced, the loss in the light intensity of the exposure beam can be minimized. In addition, thus providing the angle adjustment means for adjusting the angle of the mirrors allows the position and angle of an exposure beam to be adjusted separately with a simple structure, and further using a feedback control system allows an exposure apparatus having a function of performing an automatic optical axis adjustment to be achieved.

DESCRIPTION OF THE PREFERRED EMBODIMENTS

The present invention will hereinafter be described based on embodiments shown in the accompanying drawings. The present invention relates to a novel optical axis adjustment device and an automatic optical axis adjustment system, and further an exposure apparatus using the same. Hence, in Section 1 to Section 3 will be described the configuration and operation of an optical axis adjustment device according to the present invention, in Section 4 will be described the configuration and operation of an automatic optical axis adjustment system according to the present invention, and finally in Section 5 will be described the configuration and operation of an exposure apparatus incorporating the same for optical axis adjustment.

<<<Section 1. Basic Configuration of an Optical Axis Adjustment Device According to the Present Invention>>>

Figure 1:
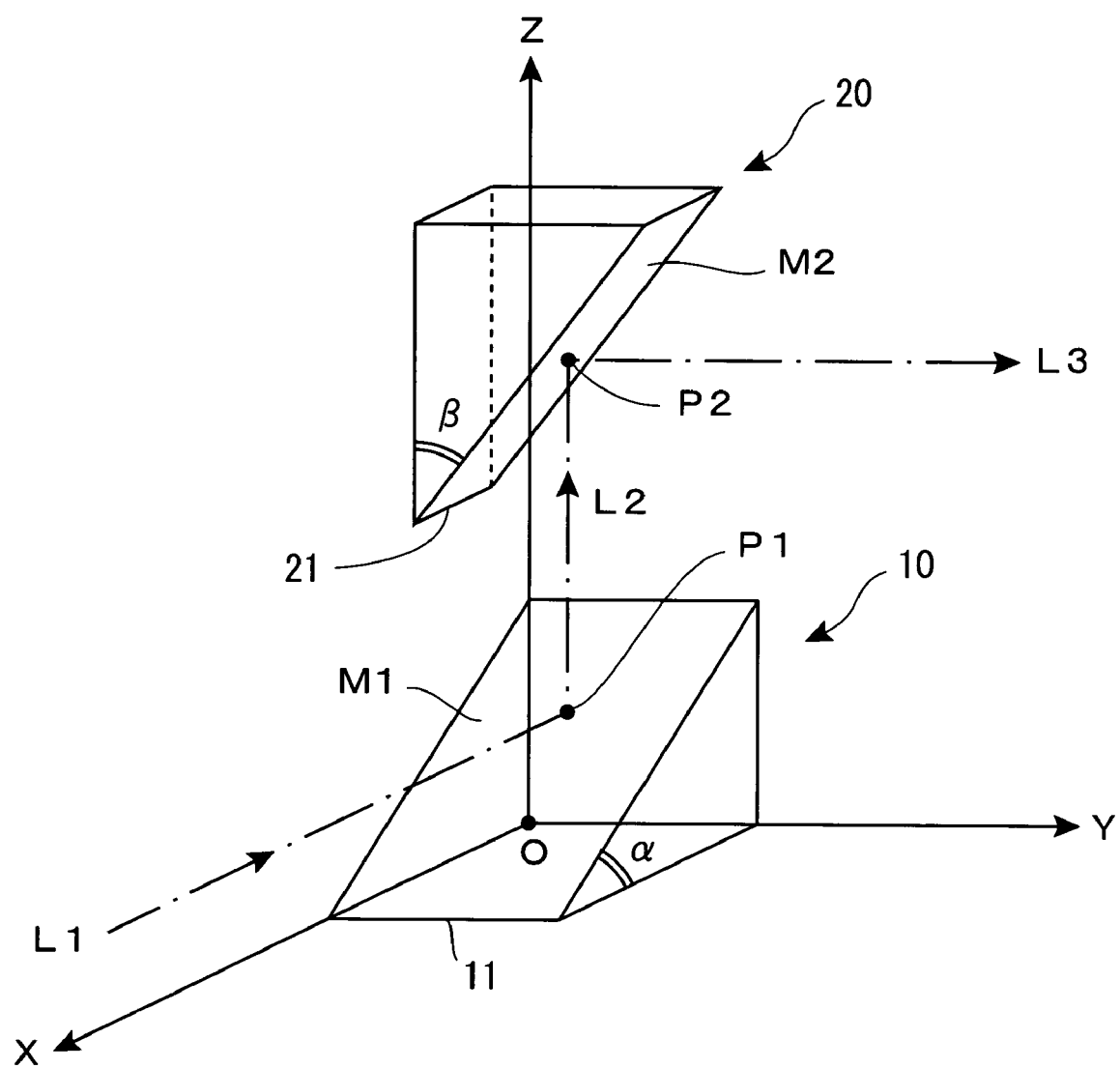
FIG. 1 is a perspective view showing the basic configuration of an optical axis adjustment device according to an embodiment of the present invention.

FIG. 1 is a perspective view showing the basic configuration of an optical axis adjustment device according to an embodiment of the present invention. As mentioned above, the present invention is mainly characterized by arranging two mirrors in particular positions and moving the mirrors parallel in particular directions to adjust the position of a light beam. Hence, in this specification, an XYZ three-dimensional coordinate system will be expediently defined, on which the arrangement and movement of the mirrors are to be described separately. The optical axis adjustment device shown in FIG. 1 is thus a device having a function of adjusting the optical axis of and outputting a light made incident to the XYZ three-dimensional coordinate system.

The most important components of the optical axis adjustment device are first and second mirrors 10 and 20. The first and second mirrors 10 and 20 are arranged in such a manner, as shown in the figure, that the reflective surfaces thereof are brought to particular positions in the XYZ three-dimensional coordinate system. That is, the reflective surface M1 of the first mirror 10 is arranged in such a manner as to be brought to a position where a plane parallel to the XY plane is rotated around a rotation axis 11 parallel to the Y axis by a predetermined angle of α ($0°<α<90°$), while the reflective surface M2 of the second mirror 20 is arranged in such a manner as to be brought to a position where a plane parallel to the XZ plane is rotated around a rotation axis 21 parallel to the X axis by a predetermined angle of β ($0°<β<90°$).

Here will be considered a case where a light beam L1 is applied to an optical system, which is composed of the thus arranged two mirrors 10 and 20, parallel to the X axis as an incident light. In this case, the light beam is reflected on the two mirrors 10 and 20 as shown in the figure (where the path of the light beam is indicated by an alternate long and short dashed line). That is, in the specific example shown in the figure, when the light beam L1 is received at an incident point P1 on the reflective surface M1 of the first mirror 10, a light beam L2 running almost upward in the figure is to be obtained as a reflected light, and when the light beam L2 is received at an incident point P2 on the reflective surface M2 of the second mirror 20, a light beam L3 running almost rightward in the figure is to be obtained as a reflected light. The light beam L1 applied as an incident light is thus to be reflected twice in the optical system and then output as the light beam L3.

In addition to the above-mentioned first and second mirrors 10 and 20, the optical axis adjustment device according to the present embodiment is also composed of a support body for supporting the mirrors and position adjustment means for moving the mirrors (either not shown in FIG. 1).

The support body may be formed specifically in any structure only if having a function of supporting the two mirrors 10 and 20 in positions that meet the above-mentioned particular conditions. For example, the support body may be composed of frames that serve as the device chassis, to which the first and second mirrors 10 and 20 are to be fixed. It is necessary, however, to fix the mirrors in such a manner that position adjustment can be performed using the position adjustment means.

The position adjustment means is a component having a function of moving the mirrors 10 and 20 parallel to predetermined axes relative to the support body to adjust the position thereof. In the present invention, the first mirror 10 is required to be moved with a parallel displacement in the X or Z axis direction, while the second mirror 20 is required to be moved with a parallel displacement in the Y or Z axis direction. Since there have been known various mechanisms for thus moving a mirror along a predetermined axis, specific descriptions for a movement mechanism will here be omitted. It is a matter of course that the position adjustment means may be constituted by a manually-operated or electrically-operated movement mechanism.

Next will be considered how the optical axis of a light beam changes when the mirrors 10 and 20 constituting the optical system are moved parallel to predetermined directions using the position adjustment means.

Figure 2:
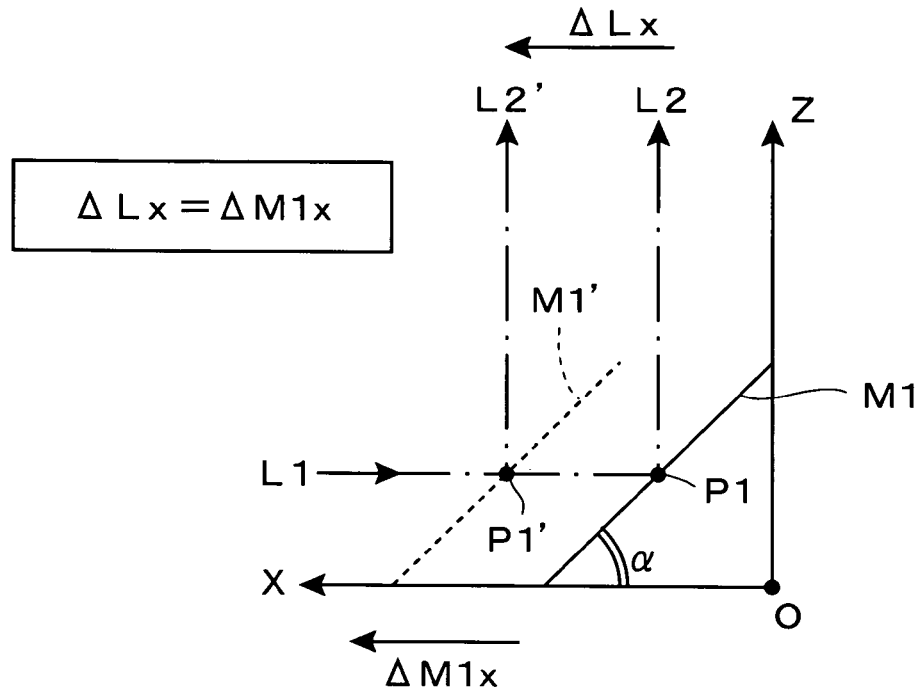
FIG. 2 is an XZ cross-sectional view showing an optical axis change caused by moving a reflective surface M1 parallel to the X axis in the optical axis adjustment device shown in FIG. 1.

FIG. 2 is an XZ cross-sectional view showing an optical axis change caused by moving the reflective surface M1 (of the first mirror 10) parallel to the X axis in the optical axis adjustment device shown in FIG. 1. The reflective surface M1 indicated by the solid line in the figure indicates the position before the movement, while the reflective surface M1' indicated by the dashed line in the figure indicates the position after the movement. As shown in the figure, before the movement, the light beam L1 is reflected at the incident point P1 on the reflective surface M1 to be output as the light beam L2, where when the reflective surface M1 is moved parallel to the X axis by a displacement of $\Delta M1x$, P1' is found to be an incident point P1 for the reflective surface M1', and the light beam L1 is to be output as a light beam L2'. When the reflective surface M1 is moved parallel to the X axis by a displacement of $\Delta M1x$, the light beam to be output as a reflected light is thus to be moved parallel to the X axis by a displacement of $\Delta Lx$, where $\Delta Lx=\Delta M1x$.

Figure 3:
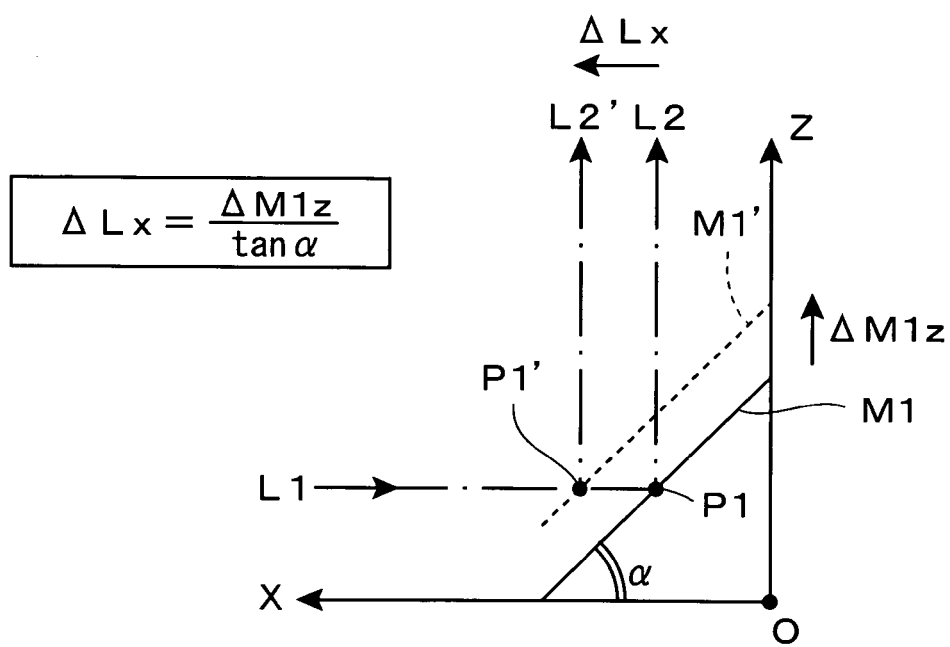
FIG. 3 is an XZ cross-sectional view showing an optical axis change caused by moving the reflective surface M1 parallel to the Z axis in the optical axis adjustment device shown in FIG. 1.

FIG. 3 is an XZ cross-sectional view showing an optical axis change caused by moving the reflective surface M1 (of the first mirror 10) parallel to the Z axis in the optical axis adjustment device shown in FIG. 1. The reflective surface M1 indicated by the solid line in the figure also indicates the position before the movement, while the reflective surface M1' indicated by the dashed line in the figure indicates the position after the movement. As shown in the figure, when the reflective surface M1 is moved parallel to the Z axis by a displacement of $\Delta M1z$, P1' is found to be an incident point for the reflective surface M1', and the light beam L1 is to be output as a light beam L2'. When the reflective surface M1 is moved parallel to the Z axis by a displacement of $\Delta M1z$, the light beam to be output as a reflected light is thus to be moved parallel to the X axis by a displacement of $\Delta Lx$, where $\Delta Lx=\Delta M1z/\tan \alpha$ if L1 is parallel to the X axis (a predefined geometrical relational expression exists also for each L1 running in any direction).

Figure 4:
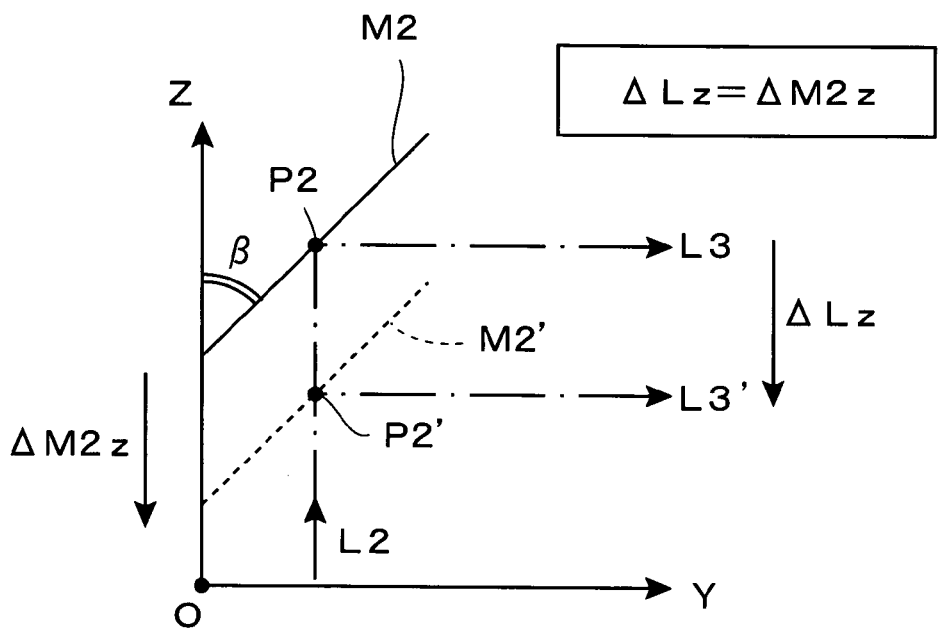
FIG. 4 is a YZ cross-sectional view showing an optical axis change caused by moving a reflective surface M2 parallel to the Z axis in the optical axis adjustment device shown in FIG. 1.

Meanwhile, FIG. 4 is a YZ cross-sectional view showing an optical axis change caused by moving the reflective surface M2 (of the second mirror 20) parallel to the Z axis in the optical axis adjustment device shown in FIG. 1. The reflective surface M2 indicated by the solid line in the figure indicates the position before the movement, while the reflective surface M2' indicated by the dashed line in the figure indicates the position after the movement. As shown in the figure, before the movement, the light beam L2 is reflected at the incident point P2 on the reflective surface M2 to be output as the light beam L3, where when the reflective surface M2 is moved parallel to the Z axis by a displacement of $\Delta M2z$, P2' is found to be an incident point for the reflective surface M2', and the light beam L2 is to be output as a light beam L3'. When the reflective surface M2 is moved parallel to the Z axis by a displacement of $\Delta M2z$, the light beam to be output as a reflected light is thus to be moved parallel to the Z axis by a displacement of $\Delta Lz$, where $\Delta Lz=\Delta M2z$.

Figure 5:
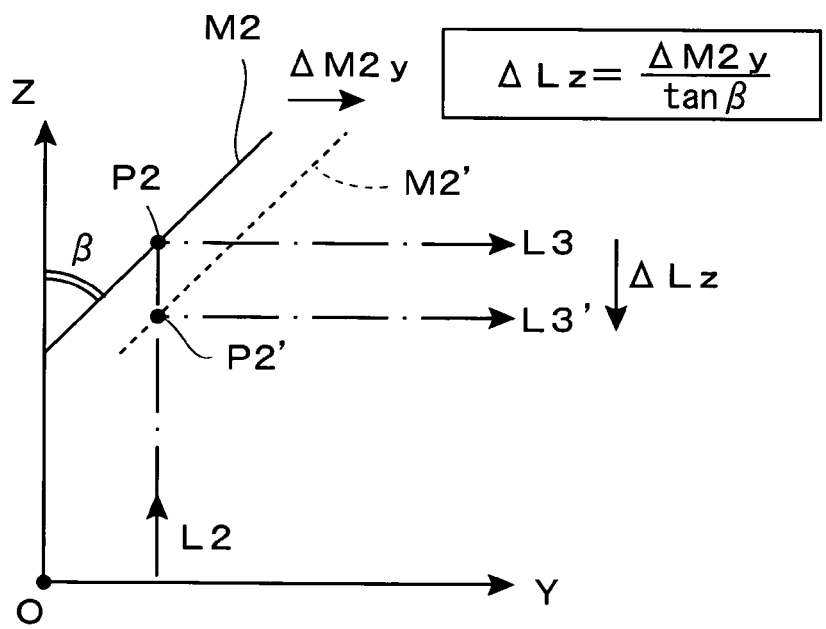
FIG. 5 is a YZ cross-sectional view showing an optical axis change caused by moving the reflective surface M2 parallel to the Y axis in the optical axis adjustment device shown in FIG. 1.

FIG. 5 is a YZ cross-sectional view showing an optical axis change caused by moving the reflective surface M2 (of the second mirror 20) parallel to the Y axis in the optical axis adjustment device shown in FIG. 1. The reflective surface M2 indicated by the solid line in the figure also indicates the position before the movement, while the reflective surface M2' indicated by the dashed line in the figure indicates the position after the movement. As shown in the figure, when the reflective surface M2 is moved parallel to the Y axis by a displacement of $\Delta M2y$, P2' is found to be an incident point for the reflective surface M2', and the light beam L2 is to be output as a light beam L3'. When the reflective surface M2 is moved parallel to the Y axis by a displacement of $\Delta M2y$, the light beam to be output as a reflected light is thus to be moved parallel to the Z axis by a displacement of $\Delta Lz$, where $\Delta Lz=\Delta M2y/\tan \beta$ if L2 is parallel to the Z axis (a predefined geometrical relational expression exists also for each L2 running in any direction).

It can be found from the above-mentioned results shown in FIG. 2 and FIG. 3 that in order to move the light beam L2, which is to be output from the reflective surface M1 of the first mirror 10 as a reflected light, parallel to the X axis, it is only required to move the first mirror 10 parallel either to the X or Z axis. It can also be found from the above-mentioned results shown in FIG. 4 and FIG. 5 that in order to move the light beam L3, which is to be output from the reflective surface M2 of the second mirror 20 as a reflected light, parallel to the Z axis, it is only required to move the second mirror 20 parallel either to the Y or Z axis.

As mentioned heretofore, the position adjustment means has functions of moving the first mirror 10 parallel to the X or Z axis and of moving the second mirror 20 parallel to the Y or Z axis relative to the support body. The former one is for moving the light beam L2 parallel to the X axis, while the latter one is for moving the light beam L3 parallel to the Z axis.

As shown in FIG. 1, when the light beam L1 parallel to the X axis is made incident to the optical axis adjustment device as an incident light, the position adjustment means can thus perform a position adjustment where the path of the light beam is moved parallel to two independent axes. Although the principle of the operation of the optical axis adjustment device shown in FIG. 1 has heretofore been described for a case where the light beam L1 parallel to the X axis is made incident, such a position adjustment function is actually available not only for the case where the light beam L1 parallel to the X axis is made incident. That is, even when a light beam slightly inclined relative to the X axis may be made incident, it is possible to perform a position adjustment where the path of the light beam is moved parallel to two independent axes only if the light beam is reflected on the first mirror 10, and then reflected on the second mirror 20 to be output. It is therefore possible to move the light beam L3 to be obtained as an outgoing light of the optical axis adjustment device to any position in parallel using the position adjustment function of the position adjustment means. In addition, due to the reversibility of the optical path, when an incident light running opposite the light beam L3 is applied, an outgoing light running opposite the light beam L1 can be obtained, which allows an optical axis adjustment to be performed in the same way.

<<<Section 2. Embodiment in Which the Mirrors are Both Fixed to the Same Support Body>>>

As mentioned in the basic embodiment above, the position adjustment means is only required to have functions of moving the first mirror 10 parallel to the X or Z axis and of moving the second mirror 20 parallel to the Y or Z axis. Therefore, for example, if a rail on which the first mirror 10 is slid along the X or Z axis is arranged on the support body to allow the first mirror 10 to be slidably mounted thereon, and likewise if a rail on which the second mirror 20 is slid along the Y or Z axis is arranged on the support body to allow the second mirror 20 to be slidably mounted thereon, these rails can serve as the position adjustment means.

In carrying out the present invention, although it is obviously possible, as mentioned above, to provide a mechanism for moving the first and second mirrors 10 and 20 separately parallel to the respective predetermined directions, an embodiment in which the first and second mirrors 10 and 20 are both fixed to the same support body will here be described. In the embodiment to be described here, the first and second mirrors 10 and 20 are fixed to a first support body while keeping the mutual positional relationship with each other as shown in FIG. 1. Then, a second support body for movably supporting the first support body is provided so that the first support body can be moved parallel to the X and Y axes relative to the second support body using the position adjustment means.

For example, another coordinate system xyz that overlaps completely with the coordinate system XYZ shown in FIG. 1 will here be considered, where the XYZ is defined as a static coordinate system, while the xyz as a dynamic coordinate system. FIG. 1 shows a state where the origins O of the coordinate systems overlap completely with each other, where it is assumed that the dynamic coordinate system xyz is a movable coordinate system movable parallel to the X and Y axes relative to the static coordinate system XYZ. It is also assumed here that the first support body is composed of physical frames lying along the coordinate axes xyz of the movable coordinate system xyz, while that the second support body is composed of physical frames lying along the coordinate axes XYZ of the static coordinate system XYZ. The second support body is sort of a component that functions as the device chassis of the optical axis adjustment device.

There is now provided position adjustment means capable of fixing the first and second mirrors 10 and 20 to the first support body (movable coordinate system xyz) and of moving the first support body (movable coordinate system xyz) parallel to the X and Y axes relative to the second support body (static coordinate system XYZ). In accordance with such an arrangement, the position of the first and second mirrors 10 and 20 varies relative to the static coordinate system XYZ while keeping the mutual positional relationship constant with each other.

For example, when the first support body (coordinate system xyz) is moved parallel to the X axis by ΔX using the position adjustment means, the first and second mirrors 10 and 20 are both displaced in the X axis direction by ΔX in the static coordinate system XYZ. Here, focusing on the displacement of the first mirror 10, it serves to allow the light beam L2 to be displaced in the X axis direction by ΔLx as shown in FIG. 2. However, focusing on the displacement of the second mirror 20, it is obvious from the perspective view in FIG. 1 that the displacement of the second mirror 20 in the X axis direction cannot contribute to the displacement of the light beam L3. The position adjustment operation where the first support body is moved parallel to the X axis relative to the second support body is thus an independent adjustment operation where the light beam L2 is displaced in the X axis direction as shown in FIG. 2.

Meanwhile, when the first support body (coordinate system xyz) is moved parallel to the Y axis by ΔY using the position adjustment means, the first and second mirrors 10 and 20 are both displaced in the Y axis direction by ΔY in the static coordinate system XYZ. Here, focusing on the displacement of the second mirror 20, it serves to allow the light beam L3 to be displaced in the Z axis direction by ΔLz as shown in FIG. 5. However, focusing on the displacement of the first mirror 10, it is obvious from the perspective view in FIG. 1 that the displacement of the first mirror 10 in the Y axis direction cannot contribute to the displacement of the light beam L2. The position adjustment operation where the first support body is moved parallel to the Y axis relative to the second support body is thus an independent adjustment operation where the light beam L3 is displaced in the Z axis direction as shown in FIG. 5.

The embodiment described in this Section 2 is characterized in that it is not necessary to perform an independent position adjustment operation (parallel movement operation) for each of the first and second mirrors 10 and 20, which allows the drive system to be simplified. That is, the first and second mirrors 10 and 20 are mounted on the same support body, i.e. the first support body, and when the first support body is moved in parallel relative to the second support body using the position adjustment means, the mirrors are to be displaced integrally in the same direction by the same displacement. Nonetheless, in the case of a parallel movement in the X axis direction, there occurs a displacement of the light beam L2 as a reflected light from the first mirror 10 only in the X axis direction, while in the case of a parallel movement in the Y axis direction, there occurs a displacement of the light beam L3 as a reflected light from the second mirror 20 only in the Z axis direction, and therefore it is possible to control the position of the final outgoing light from the optical axis adjustment device in two independent directions.

<<<Section 3. Embodiment in Which an Angle Adjustment Function is Provided>>>

Although such an optical axis adjustment device having a position adjustment function for moving a light beam to be obtained as an outgoing light to any position in parallel as the embodiments mentioned in Section 1 and Section 2 is obviously available for various applications, it is actually more preferable to further have a function of adjusting the angle of the light beam to be obtained as an outgoing light. If it is possible to perform a combinational optical axis adjustment of position adjustment (parallel movement) and angle adjustment (direction change) for a light beam to be obtained as an outgoing light, every kind of adjustment required for practical use can be covered. Hence, it is actually preferable to further add angle adjustment means in the above-mentioned embodiments.

Figure 6:
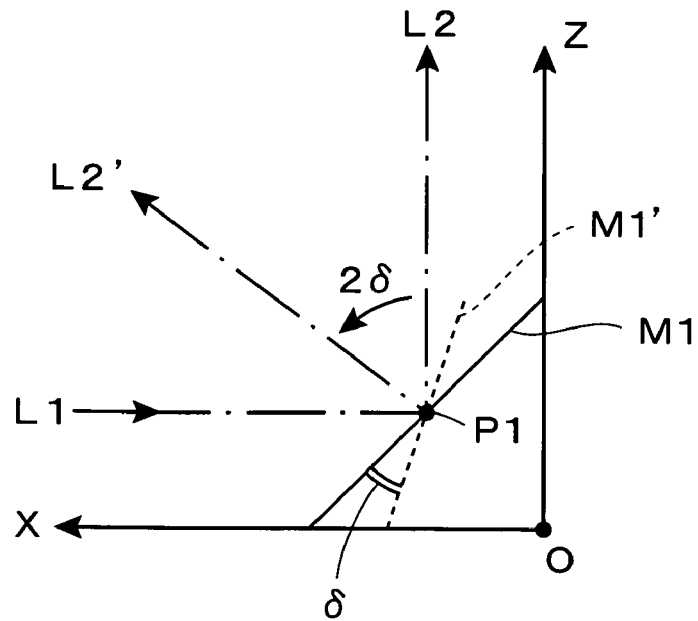
FIG. 6 is an XZ cross-sectional view showing an optical axis change caused by inclining the reflective surface M1 in a rotational manner around an axis parallel to the Y axis in the optical axis adjustment device shown in FIG. 1.

FIG. 6 is an XZ cross-sectional view showing an optical axis change caused by inclining the reflective surface M1 (of the first mirror 10) in a rotational manner around an axis parallel to the Y axis (i.e. an axis passing through the incident point P1 of the light beam L1 perpendicular to the paper surface in the figure) in the optical axis adjustment device shown in FIG. 1. The reflective surface M1 indicated by the solid line in the figure indicates the position before the inclining operation, while the reflective surface M1' indicated by the dashed line in the figure indicates the position after the inclining operation. As shown in the figure, before the inclining operation, the light beam L1 is reflected at the incident point P1 on the reflective surface M1 to be output as a light beam L2, where when the reflective surface M1 is inclined as indicated by the dashed line, the incident angle is to be changed, and the light beam L1 is to be output as a light beam L2'. When the reflective surface M1 is inclined by an angle of δ as shown in the figure, the direction of the light beam to be output as a reflected light is thus to be changed by an angle of 2δ. It is obvious that when the first mirror 10 is inclined in another direction not shown in the figure, the light beam is also to be inclined in another direction.

Figure 7:
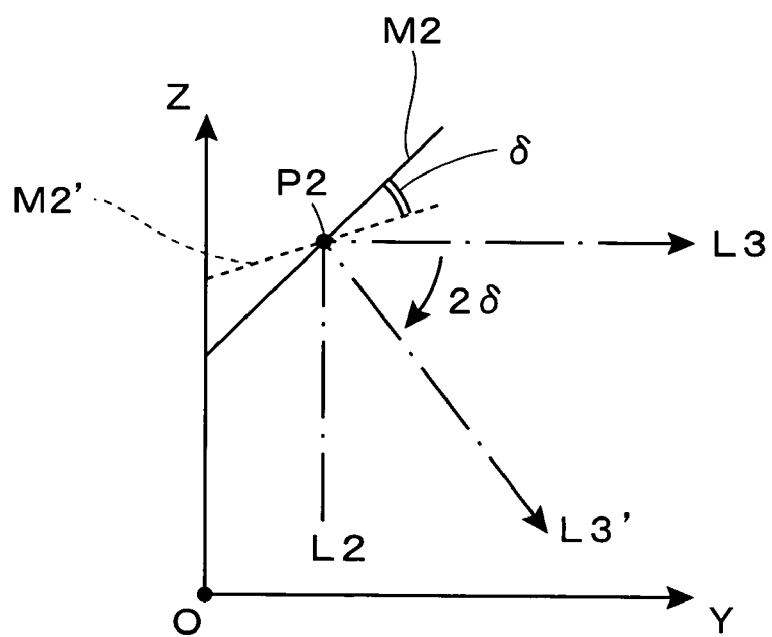
FIG. 7 is a YZ cross-sectional view showing an optical axis change caused by inclining the reflective surface M2 in a rotational manner around an axis parallel to the X axis in the optical axis adjustment device shown in FIG. 1.

FIG. 7 is a YZ cross-sectional view showing an optical axis change caused by inclining the reflective surface M2 (of the second mirror 20) in a rotational manner around an axis parallel to the X axis (i.e. an axis passing through the incident point P2 of the light beam L2 perpendicular to the paper surface in the figure) in the optical axis adjustment device shown in FIG. 1. The reflective surface M2 indicated by the solid line in the figure indicates the position before the inclining operation, while the reflective surface M2' indicated by the dashed line in the figure indicates the position after the inclining operation. As shown in the figure, before the inclining operation, the light beam L2 is reflected at the incident point P2 on the reflective surface M2 to be output as a light beam L3, where when the reflective surface M2 is inclined as indicated by the dashed line, the incident angle is to be changed, and the light beam L2 is to be output as a light beam L3'. When the reflective surface M2 is inclined by an angle of δ as shown in the figure, the direction of the light beam to be output as a reflected light is thus to be changed by an angle of 2δ. It is obvious that when the second mirror 20 is inclined in another direction not shown in the figure, the light beam is also to be inclined in another direction.

As mentioned above, the angle of a light beam can be adjusted through either an inclining operation for the first mirror 10 in a predetermined direction or an inclining operation for the second mirror 20 in a predetermined direction. Hence, it is sufficient that the angle adjustment means only has a function of performing an inclining operation for one of either the mirrors. Therefore, it is actually preferable to arrange that one of the first and second mirrors 10 and 20 is a fixed mirror not to be inclined, while the other is an inclined mirror to be inclined, only the inclined mirror being subject to an inclining operation. It is noted that since there have been known various mechanisms for thus inclining the reflective surface of a mirror in a predetermined direction, specific descriptions for an inclining mechanism will here be omitted. It is a matter of course that the angle adjustment means may be constituted by a manually-operated or electrically-operated inclining mechanism.

<<<Section 4. Embodiment of an Automatic Optical Axis Adjustment System>>>

Here will be described an embodiment of an automatic optical axis adjustment system employing the above-mentioned optical axis adjustment device with reference to the block diagram in FIG. 8. The automatic optical axis adjustment system has a function of performing an automatic optical axis adjustment so that when there is a light beam along a reference optical path passing through a predetermined incident point Pi and an outgoing point Po in an XYZ three-dimensional coordinate system, the outgoing light keeps along the reference optical path even if the incident light runs out of the reference optical path.

Figure 8:
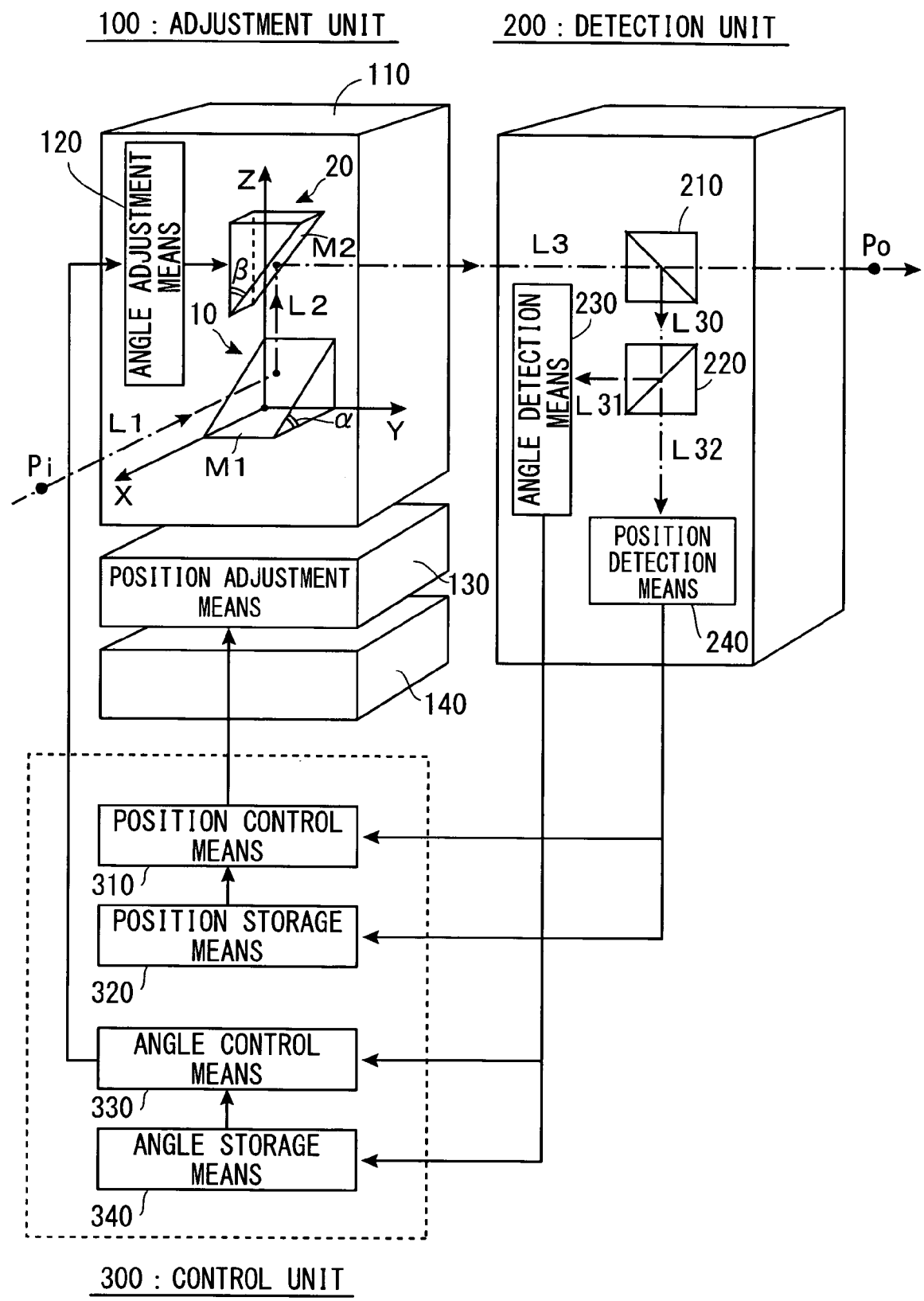
FIG. 8 is a block diagram showing the basic configuration of an automatic optical axis adjustment system according to an embodiment of the present invention.

For example, in accordance with the specific example shown in FIG. 8, a light beam L1 passing through the incident point Pi is applied as an incident light into the automatic optical axis adjustment system to be output as a light beam L3 passing through the outgoing point Po. Here, a certain reference optical path passing through the incident point Pi and the outgoing point Po (path of the light beams L1, L2, and L3 indicated by the alternate long and short dashed line in the figure) is to be ensured as long as the light beam L1 is a stable incident light. However, in the case of using a laser source, etc., to generate the light beam L1, there may occur a situation where the light beam L1 as an incident light runs out of the reference optical path not to pass through the incident point Pi shown in the figure due to factors such as start-up instability and/or secular change of the laser source. The automatic optical axis adjustment system shown here can thus perform an automatic optical axis adjustment where the light beam L3 as an outgoing light still keeps along the reference optical path even if the light beam L1 as an incident light may run out of the reference optical path.

The basic components of the automatic optical axis adjustment system are an adjustment unit 100 for performing an optical axis adjustment, a detection unit 200 for detecting optical axis displacement, and a control unit 300 for controlling the adjustment unit 100 based on a detection result by the detection unit 200 as shown in the figure.

Here, the adjustment unit 100 is constituted by an optical axis adjustment device comprising angle adjustment means according to Section 3. Although here will be described a specific example employing an optical axis adjustment device, which is obtained by adding the angle adjustment means described in Section 3 to the embodiment described in Section 2, as the adjustment unit 100, it is obvious that another optical axis adjustment device may be employed as the adjustment unit 100.

As shown in the figure, in the adjustment unit 100 is provided a first support body 110, on which the first and second mirrors 10 and 20 are mounted while keeping the mutual positional relationship with each other as shown in FIG. 1. In this specific example, the first support body 110 is a box-shaped structure housing the first and second mirrors 10 and 20 therein. Also, the first mirror 10 is a fixed mirror fixed inside the first support body 110, while the second mirror 20 is an inclined mirror mounted inside the first support body 110 in such a manner as to be able to be inclined in any direction using angle adjustment means 120. It is a matter of course that the first mirror 10 may be an inclined mirror, while the second mirror 20 may be a fixed mirror, or that both the first and second mirrors 10 and 20 may be inclined mirrors to be subject to an angle adjustment by the angle adjustment means 120.

Between the first and second support bodies 110 and 140 is provided position adjustment means 130 as drive means.

The second support body 140, which is constituted by a base structure in this specific example, serves to support the entire first support body 110. The position adjustment means 130 has a function of moving the first support body 110 parallel to the X and Y axes relative to the second support body 140. The position adjustment means 130 can be constituted by, for example, an XY stage capable of being driven by a stepping motor.

Meanwhile, the detection unit 200 has a function of detecting the angle and position of the light beam L3 output from the adjustment unit 100. In accordance with the embodiment shown in the figure, the detection unit 200 is composed of first beam splitting means 210, second beam splitting means 220, angle detection means 230, and position detection means 240. The first beam splitting means 210 has a function of extracting part of the light beam L3 reflected from the second mirror 20 as a detection-use light beam L30, while the second beam splitting means 220 has a function of further splitting the detection-use light beam L30 into two beams L31 and L32. Common beam splitters may be employed as the first and second beam splitting means 210 and 220. The angle detection means 230 has a function of detecting the angle (beam direction) based on the light beam L31 split through the second beam splitting means 220, while the position detection means 240 has a function of detecting the position based on the light beam L32 split through the second beam splitting means 220. Specific configuration examples of these detection means will hereinafter be described.

As shown in the figure, the control unit 300 is composed of position control means 310, position storage means 320, angle control means 330, and angle storage means 340, and actually a processor and a computer having an arithmetic processing function. The position storage means 320 and the angle storage means 340 have a function of storing the position and angle detected, respectively, by the position detection means 240 and the angle detection means 230 in the detection unit 200 under the condition that the light beam L1 is applied along the reference optical path as an incident light. When the light beam L1 is applied along the reference optical path, the light beam L3 is also to be output along the reference optical path. Then, the operator gives a storage command to the control unit 300 at that time. Consequently, the position and angle of the light beam L3 at that time are to be detected, respectively, by the position detection means 240 and the angle detection means 230, and then to be stored, respectively, in the position storage means 320 and the angle storage means 340 as reference values.

After the reference position and angle values are thus stored, respectively, in the position storage means 320 and the angle storage means 340, the position control means 310 and the angle control means 330 perform automatic control. That is, the position control means 310 has a function of controlling the position adjustment means 130 in such a manner, when the position detected by the position detection means 240 is different from that stored in the position storage means 320, as to eliminate the difference. When such a control input is received, the position adjustment means 130 is to perform an operation for moving the first support body 110 parallel to the X or Y axis as mentioned above. Meanwhile, the angle control means 330 has a function of controlling the angle adjustment means 120 in such a manner, when the angle detected by the angle detection means 230 is different from that stored in the angle storage means 340, as to eliminate the difference. When such a control input is received, the angle adjustment means 120 is to perform an operation for inclining the second mirror 20 in a predetermined direction as mentioned above.

Even if the light beam L1 applied as an incident light may run out of the reference optical path, an automatic optical axis adjustment for adjusting the position and angle of the light beam is to be performed in the adjustment unit 100 using such a feedback control, whereby the light beam L3 as an outgoing light keeps along the reference optical path similar to before.

Figure 9:
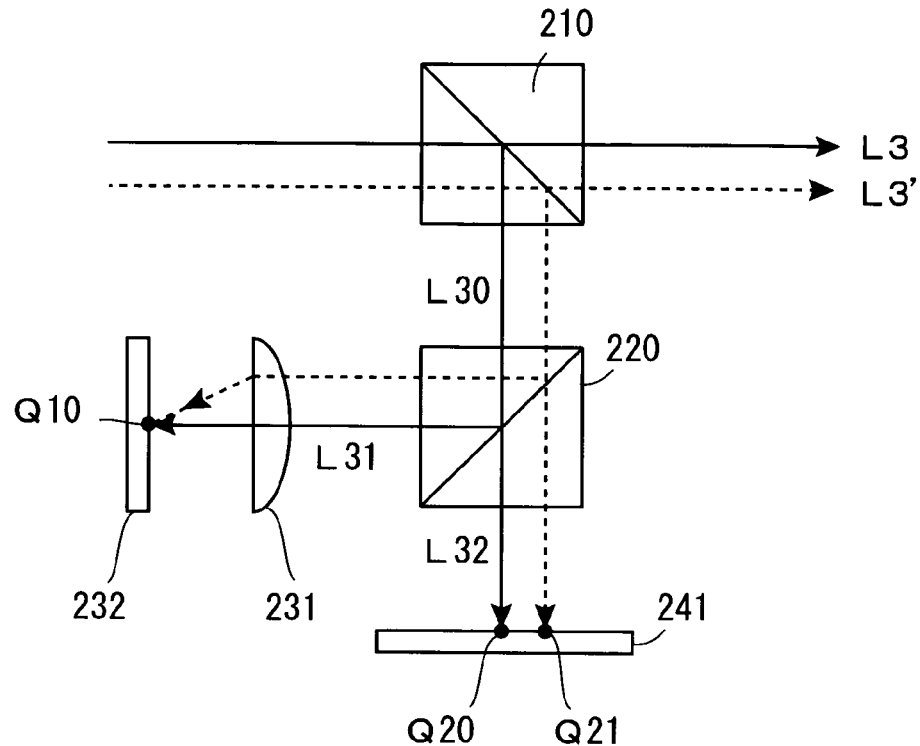
FIG. 9 is a plan view showing the principle of position detection by the detection unit 200 shown in FIG. 8.
Figure 10:
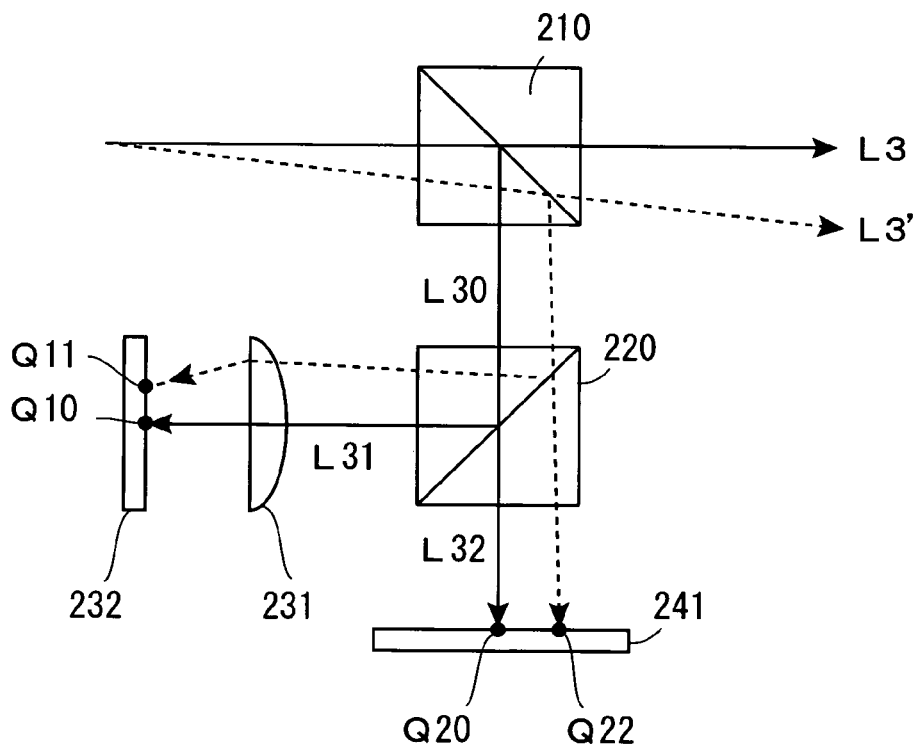
FIG. 10 is a plan view showing the principle of angle detection by the detection unit 200 shown in FIG. 8.

Finally, specific configuration examples of the angle detection means 230 and the position detection means 240 will be described with reference to FIG. 9 and FIG. 10. FIG. 9 is a plan view showing the principle of position detection by the detection unit 200 shown in FIG. 8, and FIG. 10 is a plan view showing the principle of angle detection. In these figures, the condenser lens 231 and the light-receiving element 232 are specific components of the angle detection means 230, while the light-receiving element 241 is a specific component of the position detection means 240. That is, in this specific example, the angle detection means 230 is composed of the condenser lens 231 for condensing parallel light beams onto a predetermined focal point and the light-receiving element 232 having a light-receiving surface arranged apart from the condenser lens 231 by the focal distance thereof to detect the condensing position on the light-receiving surface, while the position detection means 240 is composed of the light-receiving element 241 for detecting the beam illuminating position on a predetermined light-receiving surface.

The principle of position detection by the light-receiving element 241 will first be described with reference to FIG. 9. Now considering a situation where a light beam L3 indicated by the solid line in the figure is obtained as an outgoing light, the first beam splitting means 210 splits part of the beam as a detection-use light beam L30. The detection-use light beam L30 is split into two light beams L31 and L32 by the second beam splitting means 220. The light beam L31 transmits the condenser lens 231 to be received at an incident point Q10 on the light-receiving element 232, while the light beam L32 is illuminated at an incident point Q20 on the light-receiving element 241.

It is assumed here that the light beam L3 is displaced in parallel to the position of the light beam L3' indicated by the dashed line. Then, the incident point on the light-receiving element 241 is to be displaced from Q20 to Q21. Therefore, the light-receiving element 241 as a component of the position detection means 240 can detect the displacement. However, the incident point on the light-receiving element 232 is still at Q10. This is because the light-receiving surface of the light-receiving element 232 is placed at the focal position of the condenser lens 231. That is, a plurality of light beams made incident to the condenser lens 231, if any, are to be condensed on the same point on the light-receiving surface of the light-receiving element 232 as long as the beams are parallel to each other. As just described, the displacement of the light beam L3 is detected only by the light-receiving element 241 constituting the position detection means 240, and not by the light-receiving element 232 constituting the angle detection means 230.

The principle of angle detection by the light-receiving element 232 will next be described with reference to FIG. 10. Considering again a situation where a light beam L3 indicated by the solid line in the figure is obtained as an outgoing light. The first beam splitting means 210 splits part of the light beam L3 as a detection-use light beam L30. The detection-use light beam L30 is split into two light beams L31 and L32 by the second beam splitting means 220. The light beam L31 transmits the condenser lens 231 to be illuminated at an incident point Q10 on the light-receiving element 232, while the light beam L32 is illuminated at an incident point Q20 on the light-receiving element 241.

It is assumed here that the light beam L3 is inclined to the angle (direction) of the light beam L3' indicated by the dashed line. Then, the incident point on the light-receiving element 232 is to be displaced from Q10 to Q11. This is because the light beam indicated by the solid line is not parallel to the light beam indicated by the dashed line, which causes a displacement of the condensing point through the condenser lens 231. As just described, the angle change of the light beam L3 can be detected by the light-receiving element 232 constituting the angle detection means 230. However, since the incident point on the light-receiving element 241 is also displaced from Q20 to Q22, the angle change is to be detected also by the light-receiving element 241 constituting the position detection means 240.

The detection result by the light-receiving element 232 thus includes only the angle change, while the detection result by the light-receiving element 241 thus includes both elements of position and angle change. In view of this, in a feedback control by the control unit 300, it is theoretically preferable to first perform an angle control (by the angle control means 330) for angle correspondence, and to next perform a position control (by the position control means 310) for position correspondence. When the detection result concerning the angle corresponds with a reference value, it is possible to eliminate the change element concerning the angle from the detection result by the light-receiving element 241 to recognize only the change element concerning the position. Actually, it is not necessary to strictly consider the priority between angle control and position control if there is a feedback control, in which angle control and position control are performed alternately in a repeated manner, to bring the detection result gradually close to the reference value.

<<<Section 5. Exposure Apparatus According to the Present Invention>>>

In Section 1 to Section 3 the configuration and operation of the optical axis adjustment device according to the present invention has been described, and in Section 4 the configuration and operation of the automatic optical axis adjustment system according to the present invention has been described. Here will be described the overall configuration of an exposure apparatus according to the present invention, which is constituted by incorporating the above-mentioned optical axis adjustment device or the automatic optical axis adjustment system into an existing exposure apparatus.

Figure 11:
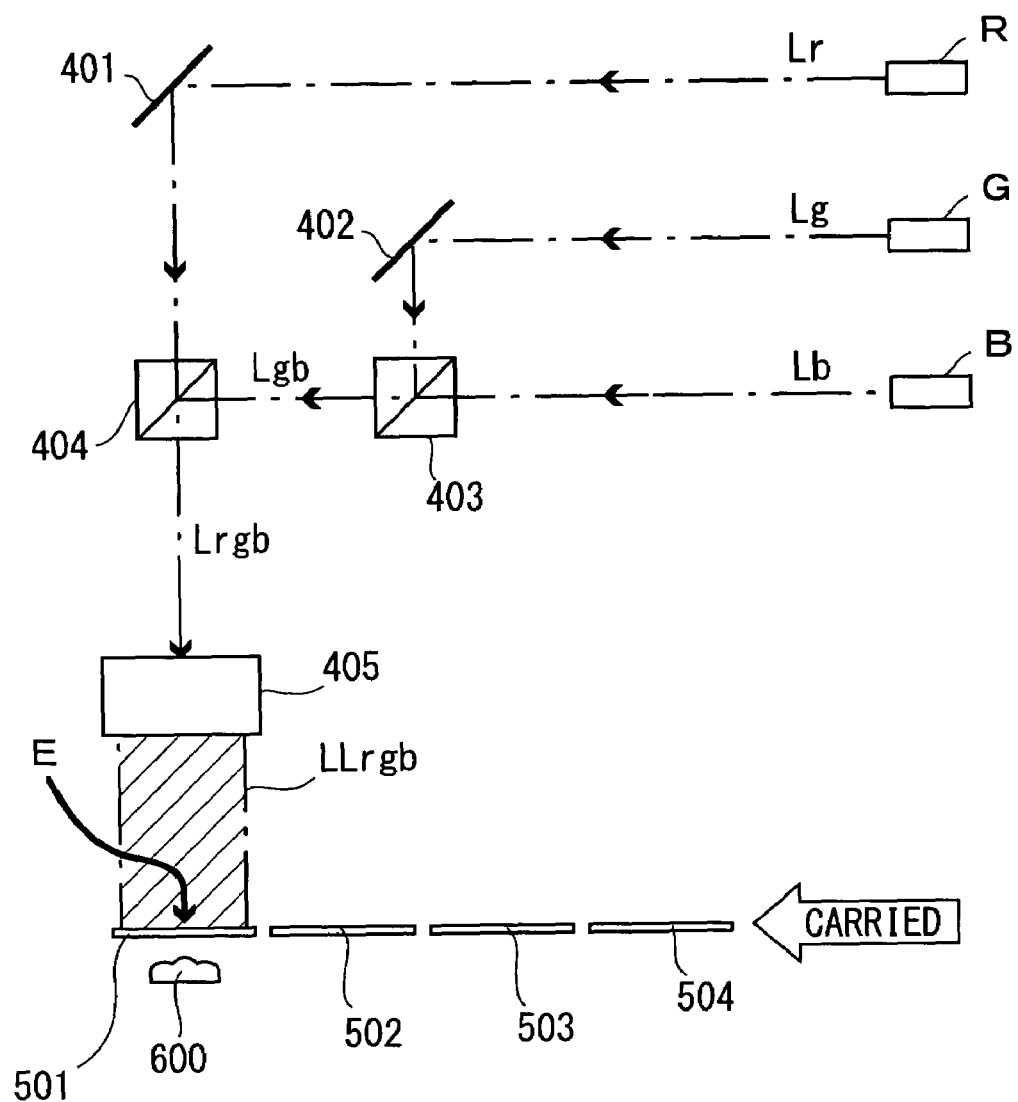
FIG. 11 is a block diagram of a common exposure apparatus for exposure operation use for color hologram images.

First, the configuration example of a conventional common exposure apparatus will expediently be described simply. FIG. 11 is a block diagram of a common exposure apparatus for exposure operation use for color hologram images. The exposure apparatus is used for exposing a photosensitive material disposed on a predetermined exposure plane by illuminating the exposure plane. Beam sources R, G, and B are laser sources for generating respective laser beams of red, green, and blue, that is, a red beam Lr, a green beam Lg, and a blue beam Lb along optical paths indicated, respectively, by the alternate long and short dashed lines shown in the figure. In order to guide the thus generated laser beams to the exposure plane, beam guiding means 401 to 404 are provided. Here, the beam guiding means 401 and 402 are reflectors (wide-band mirrors), while the beam guiding means 403 and 404 are beam multiplexers. The green beam Lg is bent downward in the figure by the reflector 402 to be made incident to the beam multiplexer 403, and then multiplexed with the blue beam Lb. The multiplexed beam Lgb is then made incident to the beam multiplexer 404. Meanwhile, the red beam Lr is bent downward in the figure by the reflector 401 to be made incident to the beam multiplexer 404, and then further multiplexed with the multiplexed beam Lgb to be a three-color multiplexed beam Lrgb to be made incident to a beam diameter expanding device 405. The beam diameter expanding device 405 is an optical element for expanding the diameter of the guided multiplexed beam Lrgb in accordance with the size of the exposure plane E, and a multiplexed beam LLrgb having an expanded beam diameter illuminates the exposure plane E as it is.

The exposure plane E is a conceptually defined plane, and actually a photosensitive material disposed on the exposure plane E is to be exposed. In the specific example shown in the figure is shown a state where photosensitive materials 501 to 504 are carried leftward in the figure along a predetermined carriage path (no carriage mechanism is included in the figure), and where the photosensitive material 501 that has been carried onto the exposure plane E is exposed. It is a matter of course that although here is described the case where the independent photosensitive materials 501 to 504 are carried, an exposure apparatus, which is arranged in such a manner as to use a take-up photosensitive film as a photosensitive material and to carry the take-up photosensitive film horizontally in the figure, may also be utilized. The specific example shown in the figure relates to an exposure apparatus for forming a so-called Lippmann type hologram image on the photosensitive materials 501 to 504, under the exposure plane E being arranged a hologram original plate 600 (e.g. a relief image representing a given motif). Also, transparent photosensitive films are used as the photosensitive materials 501 to 504. With this arrangement, an interference pattern and therefore a color hologram image of the multiplexed beam LLrgb applied from upward in the figure and a reflected light from the hologram original plate 600 is to be recorded on the photosensitive material 501.

In such an exposure apparatus, it is very important to adjust the optical axis of the multiplexed beam LLrgb. Since the cross-sectional intensity of the laser beam output from each of the beam sources R, G, and B has generally a Gaussian distribution, the cross-sectional intensity of the multiplexed beam LLrgb to be applied to the exposure plane E also has a Gaussian distribution. Accordingly, if the optical axis of a laser beam of each color is not adjusted appropriately, there occurs a difference in intensity distribution for each color on the exposure plane, resulting in color heterogeneity when reproducing a hologram image. Therefore, when installing and testing the beam sources R, G, and B, and the beam guiding means 401 to 404, an accurate optical axis adjustment operation is to be performed. For example, after arranging a measuring board with a plurality of light sensors mounted thereon, operations such as an adjustment of optical axis adjustment mechanisms built in the beam sources R, G, and B and an adjustment of the position and angle of the beam guiding means 401 to 404 are to be performed while monitoring the detection output of each light sensor.

Thus performing an accurate optical axis adjustment in the test phase when installing the exposure apparatus allows the optical axis of each laser beam to at least keep along a predetermined reference optical path, whereby it is possible to perform an exposing operation with accuracy. However, the optical axis of each beam is not necessarily fixed to an appropriate position through such an optical axis adjustment. One of the factors affecting optical axis change is an instability factor of the beam sources R, G, and B. In general, laser sources require a certain amount of time until reaching a stable operational state. Therefore, there is a possibility of an optical axis change for each laser beam until the laser source reaches a completely stable state. In addition, there may be an optical axis change due to disturbance such as a power supply voltage change even though sufficient time has passed after the start-up of the laser source. Further, there may be a gradual optical axis displacement due to a factor of secular change after long-term use. In the case of such an optical axis displacement, it is necessary to perform an optical axis adjustment operation again using an existing optical axis adjustment mechanism on a case-by-case basis.

Figure 12:
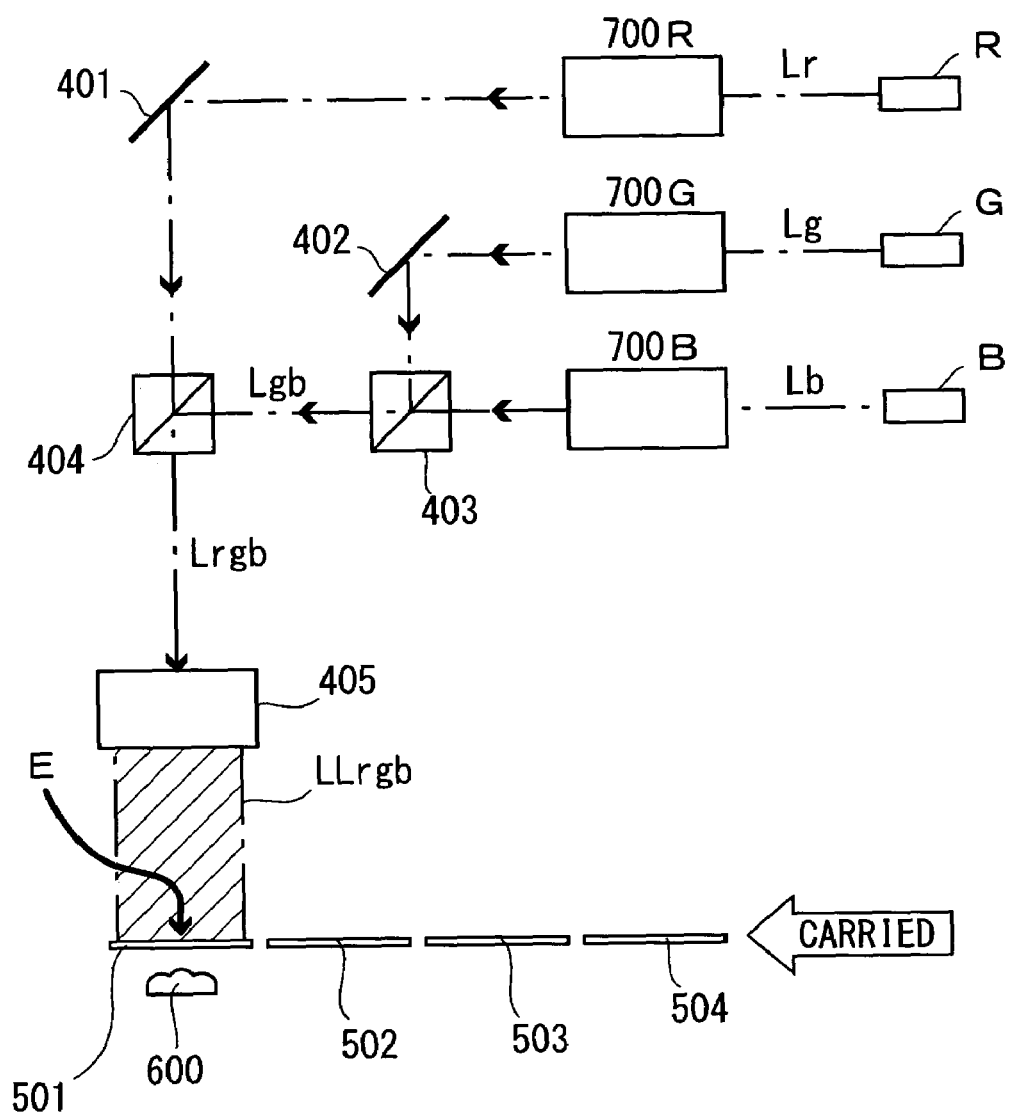
FIG. 12 is a block diagram of an exposure apparatus for color hologram image formation according to an embodiment of the present invention.

FIG. 12 is a block diagram of an exposure apparatus according to a first embodiment of the present invention. The first embodiment is characterized in that the unique optical axis adjustment device described in Section 1 to Section 3 is incorporated into the optical path of an exposure beam, which allows an optical axis adjustment operation to be performed. That is, the exposure apparatus is obtained by adding three optical axis adjustment devices 700R, 700G, and 700B to the conventional exposure apparatus shown in FIG. 11, where the optical axis adjustment devices 700R, 700G, and 700B are to function as part of the beam guiding means of this exposure apparatus. Here, one of either the various optical axis adjustment devices described in Section 1 to Section 3 may be used for each of the optical axis adjustment devices 700R, 700G, and 700B. It is actually preferable to use an optical axis adjustment device having an angle adjustment function according to Section 3. Operators can perform a manual optical axis adjustment operation by operating the optical axis adjustment devices 700R, 700G, and 700B.

In an exposure apparatus according to a second embodiment of the present invention, the unique automatic optical axis adjustment system described in Section 4 is incorporated into each of the positions indicated by the blocks 700R, 700G, and 700B shown in FIG. 12, where the automatic optical axis adjustment systems are to function as part of the beam guiding means of this exposure apparatus. The automatic optical axis adjustment system described in Section 4 has a function of keeping the position and angle of a light beam as an outgoing light unchanged even if there may be a position and/or angle change of a light beam applied as an incident light, only if and after the position and angle of the light beam are stored as reference values when the light beam passes through a predetermined reference optical path. Therefore, inserting such an automatic optical axis adjustment system into each of the positions indicated by the blocks 700R, 700G, and 700B shown in FIG. 12 allows an automatic optical axis adjustment to be performed even if there may be an optical axis change on each of the primary color beams Lr, Lg, and Lb due to a factor concerning the beam sources R, G, and B.

That is, the operator adjusts the position and angle of the beam guiding means 401 to 404 so that an appropriate multiplexed beam LLrgb is applied to the exposure plane E under the condition that the beam sources R, G, and B are in a stable state, and therefore the position and angle of the primary color beams Lr, Lg, and Lb are kept constant. Then, in this state is given an instruction for storing the position and angle as standard values for each of the automatic optical axis adjustment systems 700R, 700G, and 700B. Thus, an automatic optical axis adjustment is to be performed and an appropriate multiplexed beam LLrgb is to illuminate the exposure plane E even if there may subsequently be an optical axis change on each of the primary color beams Lr, Lg, and Lb due to any factor.

It is noted, as exemplified in FIG. 12, that providing an automatic optical axis adjustment system only in the reference optical path of the laser beam of each color cannot address an optical axis displacement due to position and/or angle change of the beam guiding means 401 to 404. In order to be able to address such a case, it is only required to further insert an automatic optical axis adjustment system into the reference optical path of the multiplexed beam Lrgb.

What is claimed is:

1. An automatic optical axis adjustment system having a function of performing an automatic optical axis adjustment so that when there is a light beam along a reference optical path passing through predetermined incident and outgoing points in an XYZ three-dimensional coordinate system, an outgoing light keeps along said reference optical path even if an incident light runs out of said reference optical path, the system being composed of:

an adjustment unit for performing an optical axis adjustment; a detection unit for detecting optical axis displacement; and a control unit for controlling said adjustment unit based on a detection result by said detection unit, said adjustment unit comprising:

a first mirror having a reflective surface obtained by rotating a plane parallel to an XY plane around a rotation axis parallel to a Y axis by a predetermined angle of $\alpha$ ($0°<\alpha<90°$);

a second mirror having a reflective surface obtained by rotating a plane parallel to an XZ plane around a rotation axis parallel to an X axis by a predetermined angle of $\beta$ ($0°<\beta<90°$);

a support body for supporting said first and second mirrors in predetermined positions so that an incident light is reflected on at least both said mirrors to be output;

position adjustment means for moving said first mirror with a parallel displacement in an X or Z axis direction and for moving said second mirror with a parallel displacement in a Y or Z axis direction relative to said support body; and angle adjustment means having a function of performing an inclining operation in a predetermined direction for at least one of either said first or second mirror, said detection unit having a function of detecting an angle and a position of a light beam output from said adjustment unit, and said control unit comprising: storage means for storing an angle and a position detected by said detection unit when an incident light runs along said reference optical path; and control means for controlling said angle adjustment means and said position adjustment means in such a manner, when an angle and a position detected by said detection unit are different from those stored in said storage means, as to eliminate a difference, wherein said detection unit comprises: first beam splitting means for extracting part of a light beam output from the adjustment unit as a detection-use light beam; second beam splitting means for splitting said detection-use light beam into two beams; angle detection means for detecting an angle based on a first split beam; and position detection means for detecting a position based on a second split beam, said angle detection means is composed of: a condenser lens for condensing parallel light beams onto a predetermined focal point; and a light-receiving element having a light-receiving surface arranged apart from said condenser lens by a focal distance thereof to detect a condensing position on said light-receiving surface, and said position detection means is composed of a light-receiving element for detecting a beam receiving position on a predetermined light-receiving surface.

2. The automatic optical axis adjustment system as set forth in claim 1, wherein:

the control means first performs an angle control for angle correspondence and then performs a position control for position correspondence.

3. The automatic optical axis adjustment system as set forth in claim 1, wherein:

one of the first and second mirrors is a fixed mirror not to be inclined, while the other is an inclined mirror to be inclined, only the inclined mirror being subject to an inclining operation.

4. An automatic optical axis adjustment system having a function of performing an automatic optical axis adjustment so that when there is a light beam along a reference optical path passing through predetermined incident and outgoing points in an XYZ three-dimensional coordinate system, an outgoing light keeps along said reference optical path even if an incident light runs out of said reference optical path, the system being composed of:

an adjustment unit for performing an optical axis adjustment; a detection unit for detecting optical axis displacement; and a control unit for controlling said adjustment unit based on a detection result by said detection unit, said adjustment unit comprising:

a first mirror having a reflective surface obtained by rotating a plane parallel to an XY plane around a rotation axis parallel to a Y axis by a predetermined angle of $\alpha$ ($0° < \alpha < 90°$);

a second mirror having a reflective surface obtained by rotating a plane parallel to an XZ plane around a rotation axis parallel to an X axis by a predetermined angle of $\beta$ ($0° < \beta < 90°$);

a first support body for supporting said first and second mirrors in predetermined positions so that an incident light is reflected on at least both said mirrors to be output;

a second support body for supporting said first support body;

position adjustment means for moving said first support body with a parallel displacement in the X and Y axes directions relative to said second support body; and angle adjustment means having a function of performing an inclining operation in a predetermined direction for at least one of either said first or second mirror, said detection unit having a function of detecting an angle and a position of a light beam output from said adjustment unit, and said control unit comprising: storage means for storing an angle and a position detected by said detection unit when an incident light runs along said reference optical path; and control means for controlling said angle adjustment means and said position adjustment means in such a manner, when an angle and a position detected by said detection unit are different from those stored in said storage means, as to eliminate a difference, wherein said detection unit comprises: first beam splitting means for extracting part of a light beam output from the adjustment unit as a detection-use light beam; second beam splitting means for splitting said detection-use light beam into two beams; angle detection means for detecting an angle based on a first split beam; and position detection means for detecting a position based on a second split beam, said angle detection means is composed of: a condenser lens for condensing parallel light beams onto a predetermined focal point; and a light-receiving element having a light-receiving surface arranged apart from said condenser lens by a focal distance thereof to detect a condensing position on said light-receiving surface, and said position detection means is composed of a light-receiving element for detecting a beam receiving position on a predetermined light-receiving surface.

5. The automatic optical axis adjustment system as set forth in claim 4, wherein:

the control means first performs an angle control for angle correspondence and then performs a position control for position correspondence.

6. The automatic optical axis adjustment system as set forth in claim 4, wherein:

one of the first and second mirrors is a fixed mirror not to be inclined, while the other is an inclined mirror to be inclined, only the inclined mirror being subject to an inclining operation.

* * * * *